US008480160B2

(12) United States Patent  
Mitsuo et al.

(10) Patent No.: US 8,480,160 B2  
(45) Date of Patent: Jul. 9, 2013

(54) STRUCTURE FOR MOUNTING AN ATTACHMENT FOR VEHICLE

(75) Inventors: Kazutaka Mitsuo, Utsunomiya (JP); Ryoichi Adachi, Nasukarasuyama (JP); Jun Takada, Takanezawa-machi (JP); Masanori Seo, Utsunomiya (JP)

(73) Assignee: Honda Access Corp., Niiza-shi, Saitama (JP)

( * ) Notice: Subject to any disclaimer, the term of this patent is extended or adjusted under 35 U.S.C. 154(b) by 424 days.

(21) Appl. No.: 12/915,564

(22) Filed: Oct. 29, 2010

(65) Prior Publication Data  
US 2011/0150598 A1 Jun. 23, 2011

(30) Foreign Application Priority Data  
Dec. 22, 2009 (JP) ................................. 2009-291246

(51) Int. Cl.  
*B62D 35/00* (2006.01)

(52) U.S. Cl.  
USPC .......................... 296/180.2; 293/102; 293/155

(58) Field of Classification Search  
USPC ............. 293/102, 154, 155; 296/180.1, 180.2  
See application file for complete search history.

(56) References Cited

U.S. PATENT DOCUMENTS

| | | | | |
|---|---|---|---|---|
| 5,375,954 A * | 12/1994 | Eguchi | ............................. | 411/48 |
| 5,987,652 A * | 11/1999 | Fowler | ............................. | 2/424 |
| 6,948,753 B2 * | 9/2005 | Yoshida et al. | ............... | 296/1.08 |
| 7,017,239 B2 * | 3/2006 | Kurily et al. | ..................... | 24/297 |
| 7,222,894 B2 * | 5/2007 | Suwa | ............................. | 293/102 |
| 7,325,861 B2 * | 2/2008 | Zacheiss et al. | ......... | 296/187.09 |
| 8,083,285 B2 * | 12/2011 | Yanagida et al. | .......... | 296/181.5 |
| 2003/0141304 A1 * | 7/2003 | Franjo et al. | ................... | 220/562 |
| 2005/0034282 A1 * | 2/2005 | Kurily et al. | ..................... | 24/297 |
| 2010/0078534 A1 * | 4/2010 | Yanagida et al. | ........ | 248/220.21 |

FOREIGN PATENT DOCUMENTS

| | | |
|---|---|---|
| JP | 60-111768 U | 7/1985 |
| JP | 62-215112 A | 9/1987 |
| JP | 63-109277 U | 7/1988 |
| JP | 2001-012425 A | 1/2001 |
| JP | 2002-61622 A | 2/2002 |
| JP | 3304868 B2 | 7/2002 |

OTHER PUBLICATIONS

Japanese Office Action dated Oct. 31, 2011, issued in corresponding Japanese Patent Application No. 2009-291246.  
Japanese Office Action mailed Jun. 18, 2012, issued in corresponding Japanese Patent Application No. 2009-291246.

* cited by examiner

*Primary Examiner* — Lori Lyjak  
(74) *Attorney, Agent, or Firm* — Westerman, Hattori, Daniels & Adrian, LLP

(57) ABSTRACT

There is provided a structure for mounting an attachment for vehicle capable of absorbing the marginal difference of a front spoiler and reducing the procedures for controlling the dimension of the front spoiler. The structure for mounting a front spoiler on a front bumper includes: a male clip provided on the front spoiler; an insertion hole provided on the front bumper for inserting the male clip therethrough; and a female clip engaged with the male clip and allowing the front spoiler to be held by the front bumper. The male clip is loosely inserted through the insertion hole and engaged with the female clip around the insertion hole via an abutting brim, thereby producing a gap between the insertion hole and the male clip, thus increasing the degree of freedom of positional adjustment, reducing the steps for mounting and controlling the accuracy of the attachment, reducing the overall cost.

11 Claims, 5 Drawing Sheets

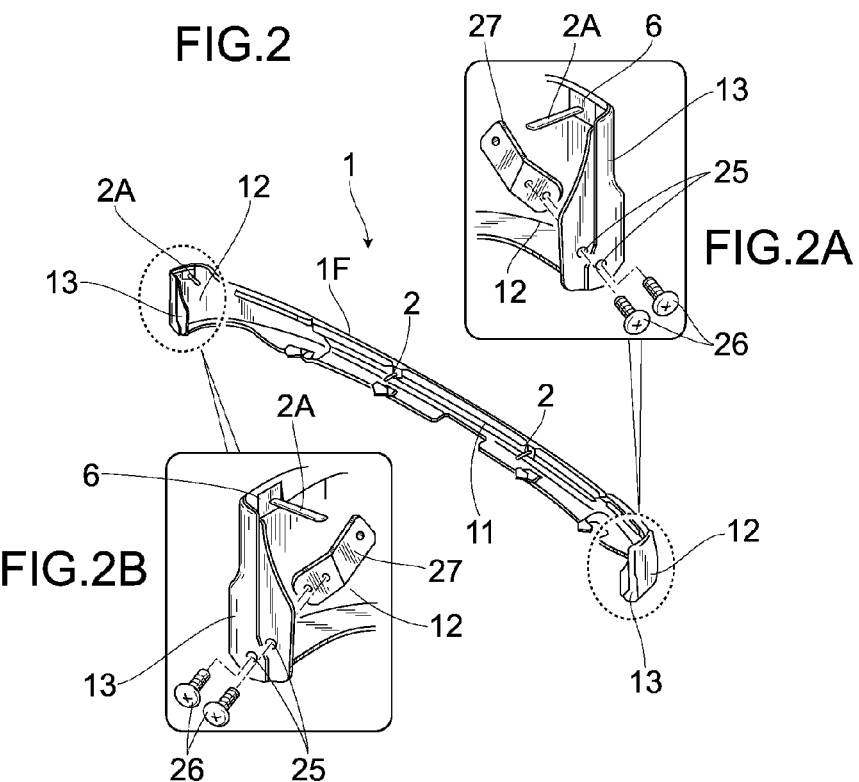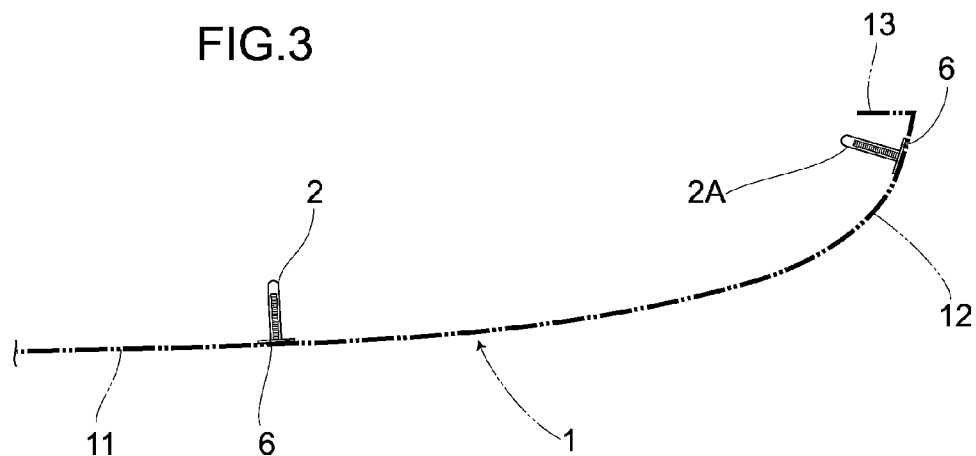

FIG.4
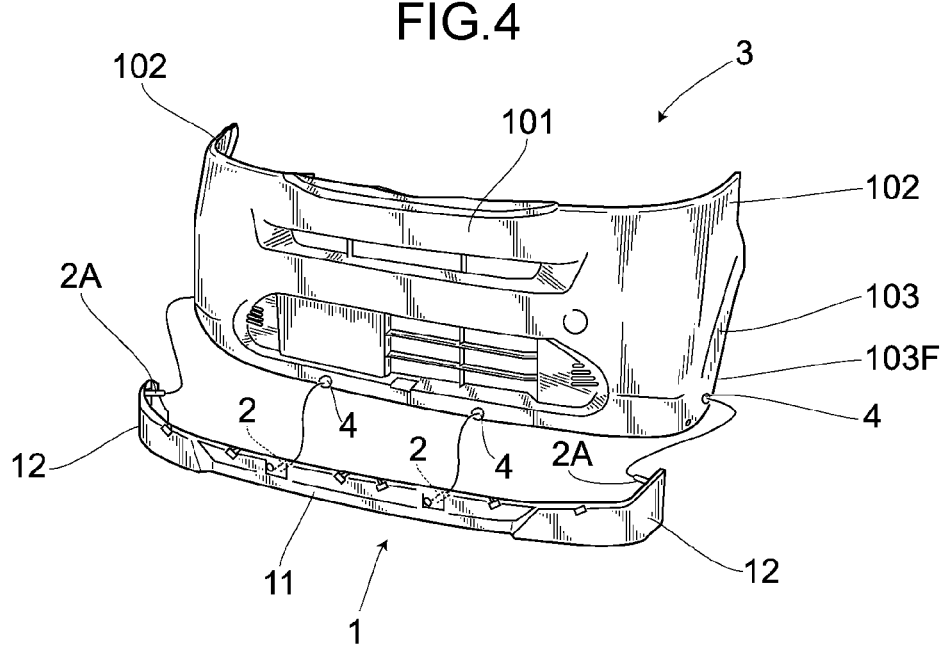
FIG.5
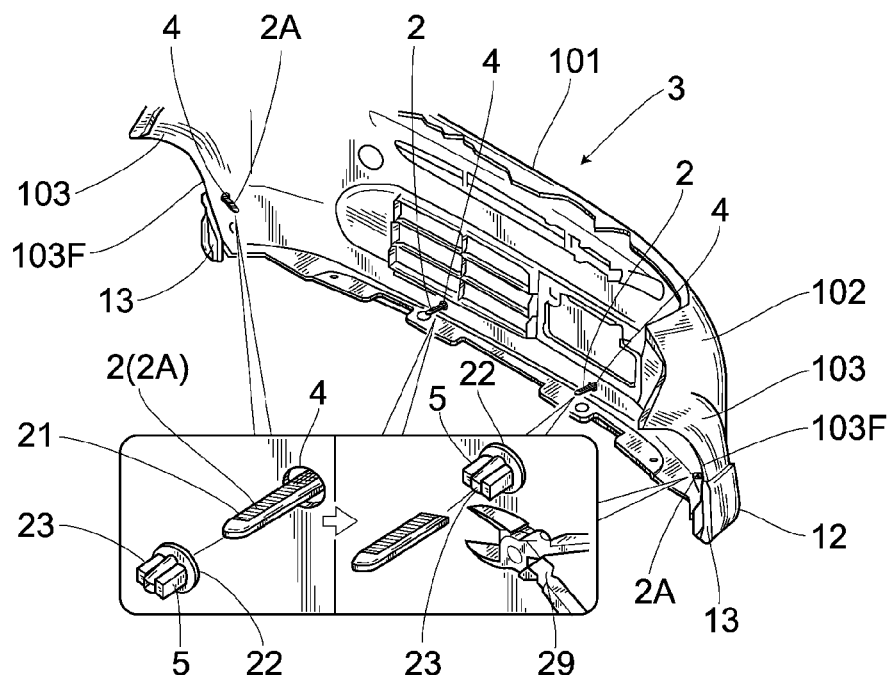
FIG.5A   FIG.5B

STRUCTURE FOR MOUNTING AN ATTACHMENT FOR VEHICLE

BACKGROUND OF THE INVENTION

1. Field of the Invention

The present invention relates to a structure for mounting an attachment on a component already mounted on a vehicle, in particular to a structure for mounting an attachment for vehicle comprising a male clip provided on the attachment, an insertion hole provided on the component for inserting the male clip therethrough, and a female clip engaged with the male clip.

2. Description of Related Art

Conventionally, there has been known a structure for mounting a resin component on a vehicle, in which a resin front spoiler is secured to a resin front bumper by inserting a boss portion protruding from the resin front spoiler into an attachment hole provided in the resin front bumper, and rendering an annular locking ring to abut against a fixing surface of the resin front bumper by putting the annular locking ring on the boss portion on the side opposite to the side on which the boss portion is inserted, as disclosed, for example, in Japanese patent publication No. 3304868.

SUMMARY OF THE INVENTION

With regard to the aforementioned structure for mounting a resin component, an undesired gap may occur in a corner portion of the front spoiler, due to the dimensional differences resulting from the respective forming conditions, etc. of the front spoiler and the front bumper, and due to the imprecise location of an attachment hole, especially since the front spoiler is formed into an elongated shape.

Therefore, in view of the abovementioned problem, it is, therefore, an object of the present invention to provide a structure for mounting an attachment for vehicle that is capable of absorbing the marginal difference intrinsic to the attachment to be mounted and reducing the number of the steps for controlling the dimensions of the attachment to be mounted.

In order to achieve the aforementioned object, the invention according to a first aspect provides a structure for mounting an attachment for vehicle, the structure allowing the attachment to be mounted on a component already mounted on a vehicle, including:

a male clip provided on the attachment;

an insertion hole provided on the component for inserting the male clip therethrough; and a female clip which is engaged with the male clip inserted through the insertion hole so as to allow the attachment to be held by the component, wherein the male clip is loosely inserted through the insertion hole, while the female clip is engaged with the male clip around the insertion hole.

According to the invention of a second aspect, the attachment is an elongated member and the insertion hole is provided substantially on an end portion of the component.

According to the invention of a third aspect, the attachment includes: an elongated portion; and a side edge portion provided on an end portion of the elongated portion in a longitudinal direction thereof, the side edge portion being formed in a direction intersecting the longitudinal direction, and the male clip is provided on the edge portion, extending in a substantially longitudinal direction of the elongated portion.

According to the invention of a fourth aspect, the transverse dimension of the insertion hole is 1.5 or more times longer than that of the male clip.

According to the invention of a fifth aspect, the component is a bumper made of synthetic resin, and the attachment is a spoiler also made of synthetic resin.

According to the structure for mounting an attachment for vehicle of the first aspect, a gap occurs between the insertion hole and the male clip when mounting the attachment on the component, thereby increasing the degree of freedom of positional adjustment, namely the degree of freedom of mounting, thereby reducing the number of the steps for mounting as well as the number of the procedures for controlling the accuracy of the attachment, and reducing the overall cost.

Furthermore, according to the structure for mounting an attachment for vehicle of the second aspect, the dimension of an elongated member, in general, may substantially vary at the time of forming, and yet the structure for mounting an attachment of the third aspect is capable of meeting the dimensional changes of the attachment with age accompanying the repeated expansion and contraction thereof caused by temperature change. According to the present invention, therefore, it becomes possible to simplify the control process for manufacturing the attachment, reduce the number of the steps for mounting, and address such changes with time.

Furthermore, according to the structure for mounting an attachment of the third aspect, the position of the male clip provided on the side edge portion of the attachment may be adjusted relative to a direction intersecting the longitudinal direction, thereby making it possible to fit the end portion of the elongated portion of the attachment to the component without leaving any undesired space.

Furthermore, according to the structure for mounting an attachment for vehicle of the fourth aspect, it is possible to ensure the absorbing of the marginal differences between the component and the attachment.

Further, according to the structure for mounting an attachment for vehicle of the fifth aspect, when mounting a resin spoiler on a resin bumper, a gap between the insertion hole and the male clip enables the increasing of the degree of freedom of positional adjustment, namely the degree of freedom in mounting, reducing the number of the steps for mounting as well as the number of the procedures for controlling the accuracy of the attachment, and reducing the overall cost.

BRIEF DESCRIPTION OF THE DRAWINGS

FIG. 2 is a perspective view showing an attachment with one section thereof enlarged, and FIG. 2A and FIG. 2B are partly enlarged views thereof, according to the same embodiment as above.

FIG. 3 is a top plan view of the attachment according to the same embodiment as above.

FIG. 4 is a perspective view showing the front side of a vehicle, illustrating a method for mounting the attachment on the front side thereof, according to the same embodiment as above.

FIG. 5 is a perspective view showing the component, and FIG. 5A and FIG. 5B are partly enlarged views thereof, according to the same embodiment as above.

DETAILED DESCRIPTION OF THE INVENTION

Figure 1:
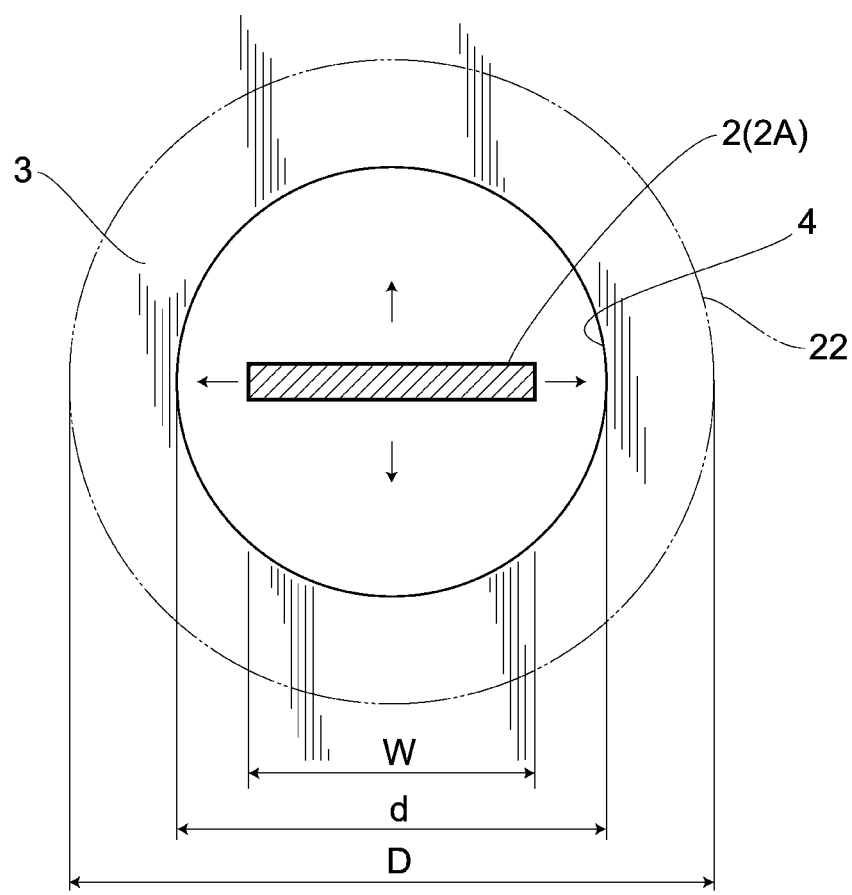
FIG. 1 is a cross section of a male clip inserted through an insertion hole, according to a first embodiment of the present invention.

A first embodiment of the present invention will be described hereinafter with reference to the accompanying drawings.

As shown in FIG. 1 to FIG. 6, a structure for mounting an attachment of the present invention includes: male clips 2, 2A provided on a front spoiler 1 referred to as an attachment and made of synthetic resin; insertion holes 4 provided on a front bumper 3 referred to as a component already mounted on a vehicle and also made of synthetic resin, for inserting the male clips 2, 2A therethrough; and female clips 5 to be engaged with the male clips 2. Further, each of said male clips 2, 2A has a plate-shaped base portion 6, and is integrally provided on the front spoiler 1 by, for example, bonding the base portion 6 to the front spoiler 1.

Said front bumper 3 is integrally provided with an elongated portion 101 extending toward the left and right sides thereof, and corner portions 102, 102 referred to as the side edge portion and provided on the end portion of the elongated portion 101, and each corner portion 102 is formed in a substantially front-to-back direction, specifically a direction intersecting the longitudinal direction of said elongated portion 101. Further, close to the end portion of said corner portion 102, there is formed a wheel housing portion 103 constituting a part of a wheel house of a vehicle.

Said front spoiler 1 is an under spoiler disposed along the lower portion of the front face of the front bumper 3, and is integrally provided with an elongated portion 11 extending toward the left and right sides thereof, and corner portions 12 hereinafter referred to as the side edge portion and provided on the end portion of the elongated portion 11, and each corner portion 12 is formed in a substantially front-to-back direction, specifically a direction intersecting the longitudinal direction of the elongated portion 11. Further, a wheel housing flange portion 13 is provided on the end portion of the corner portion 12, protruding from the rear surface thereof and covering the lower portion of a periphery 103F of the wheel housing portion 103.

A plurality of the strip-shaped male clips 2, 2A are provided on the rear surface of the front spoiler 1. Specifically, as shown in FIG. 2 and FIG. 3, two male clips 2 are provided on the left and right sides of the center portion of the elongated portion 11, protruding from the rear surface thereof toward a substantially rear direction. Further, other two male clips 2A are provided on the left and right corner portions 12 in such a manner that they respectively protrude from the rear surface thereof in a substantially lateral direction. These male clips 2, 2A are provided on the upper portion of the front spoiler 1.

A receiving portion 21 is formed on both sides of each of said male clips 2, 2A for engaging the female clips 5 therewith. Further, as shown in FIG. 1, the mail clips 2, 2A have a substantially rectangular-shaped cross section, and are elongated in its lateral direction. Further, the male clips 2, 2A are formed into a thin strip shape and bendable, and can actually be bended in the vertical direction thereof. In addition, said receiving portion 21 can be, for example, a portion having indentations.

Said female clip 5 is integrally formed with an abutting brim 22 which is to contact with the rear surface of the front bumper 3, and a cylindrical engagement portion 23 with which the male clips 2,2A are to be engaged, with the abutting brim 22 being disposed on a base portion of the cylindrical engagement portion 23, and with the outer periphery of the abutting brim 22 being formed into a substantially circular shape. Further, said cylindrical engagement portion 23 has claw-shaped engagement members 24 for engaging with the receiving portion 21, permitting the insertion of said male clips 2, 2A and preventing the male clips 2, 2A from falling out in the direction opposite to the direction in which they are inserted.

Next, as shown in FIG. 1, the transverse dimension of each insertion hole 4 is made in a size being longer than the transverse dimension W of said male clips 2, 2A, but shorter than the transverse dimension W of the abutting brims 22, thereby allowing the male clips 2, 2A to be loosely inserted through the insertion hole 4. In addition, in the aforementioned case, since the insertion hole 4 is formed into a circular shape, the transverse dimension thereof is namely diameter d, and since the abutting brim 22 is also formed into a circular shape, the transverse dimension thereof is namely diameter D. Said diameter d is preferably made 1.5 or more times longer than the transverse dimension W of the male clip 2, 2A. For example, when the transverse dimension W of the male clips 2, 2A is 8 mm, said diameter d is preferably made as long as 12 mm, with said diameter D being 18 mm. Because of such arrangement, the male clips 2, 2A are allowed to move in both the vertical and horizontal directions with respect to the insertion hole 4, thereby producing a gap between the insertion hole 4 and the male clips 2, 2A, thus absorbing the marginal difference between the front spoiler 1 and the front bumper 3. Preferably, said diameter d is made at least 1.5 times but not more than 2.5 times the length of the dimension W of the male clips 2, 2A.

A plurality of attachment holes 25 are provided on the lower portion of the wheel housing flange portion 13. One end of a bracket 27 is fixed to said wheel flange portion 13 by means of fixing screws 26 inserted through said attachment holes 25, while the other end of the bracket 27 is fixed to the outer surface of the front bumper 3 by virtue of other fixing means such as a bolt and nut or the like.

Figure 6:
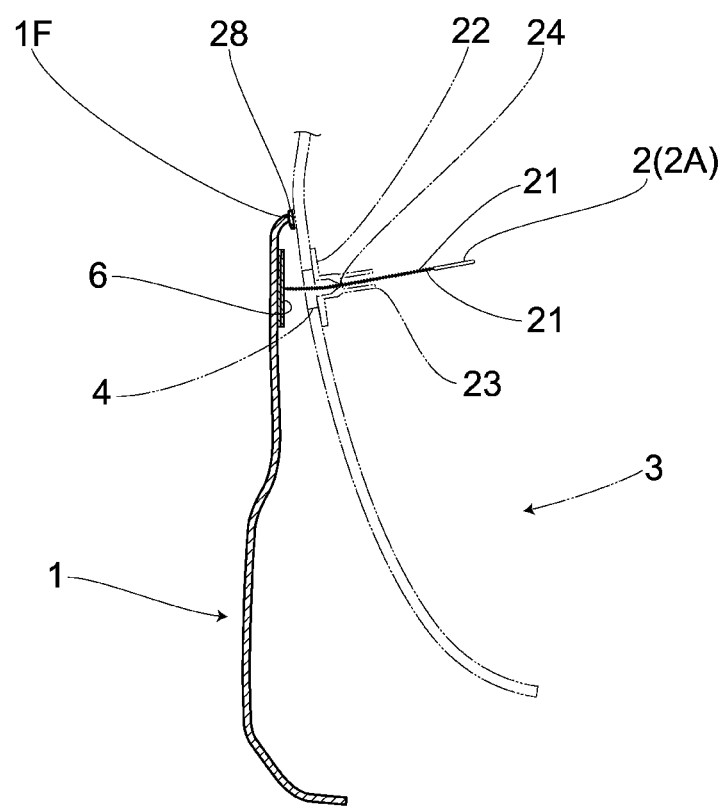
FIG. 6 is a cross section of a structure for mounting the attachment, according to the same embodiment as above.

Further, as shown in FIG. 6, an upper edge portion 1F serving as a contact edge portion of the front spoiler 1 abuts against the front bumper 3 and is bonded to it by means of a double-stick tape 28.

Next is a description of a method for mounting the front bumper 3. The insertion holes 4 are formed at predetermined spots by means of a drill not shown. As shown in FIG. 5, the male clips 2, 2A are each inserted through the corresponding insertion hole 4 from the outer surface of the front bumper 3, followed by inserting the male clips 2, 2A into the female clip 5, with the abutting brim 22 of the female clip 5 abutting against the rear surface of the front spoiler 1, thus engaging the female clips 5 with the male clips 2, 2A, respectively. At this time, the excessive portion of each of the male clips 2,2A protruding from the female clips 5 is cut off by virtue of a nipper 29 serving as a cutting means.

In this way, the front spoiler 1 is mounted on the front bumper 3 by means of the male clips 2, 2A and the female clips 5, and thus a gap occurs between the insertion hole 4 and each of the male clips 2, 2A, thereby addressing the imprecise location of the insertion hole 4 associated with the processing of hole, and the dimensional change with time, of the elongated front spoiler 1.

Therefore, according to the present embodiment, there is provided a structure for mounting an attachment for vehicle in accordance with the first aspect, said structure being provided for mounting the front spoiler 1 referred to as the attachment on the front bumper 3 referred to as the component already mounted on the vehicle, in which the male clips 2, 2A are provided on the front spoiler 1, and the insertion holes 4 are provided on the front bumper 3 for inserting the male clips 2, 2A therethrough. Further, the front spoiler 1 is held by the front bumper 3 by engaging the female clips 5 with the male clips 2, 2A inserted through the insertion holes 4, in such a manner that the male clips 2, 2A are actually loosely inserted through the insertion holes 4 and engaged with the female clips 5 around the insertion holes 4. Because of such arrangement, gaps occur between the insertion holes 4 and the male clips 2, 2A, thereby increasing the degree of freedom of positional adjustment, namely the degree of freedom of mounting, thus reducing the number of the steps for mounting as well as the number of the procedures for controlling the accuracy of the attachment, and reducing the overall cost.

According to the present embodiment and with respect to the second aspect, the front spoiler 1 is an elongated member and the insertion holes 4 are provided substantially on the end portions of the front bumper 3. Accordingly, even for the elongated member the dimension of which substantially may vary at the time of forming, the structure for mounting an attachment for vehicle of the third aspect is capable of meeting the dimensional changes of the attachment with age accompanying the repeated expansion and contraction thereof caused by temperature change, and thus, it becomes possible to simplify the control process for manufacturing the attachment, reduce the number of the steps for mounting, and address such changes with time.

According to the present embodiment and with respect to the third aspect, the front spoiler 1 includes: the elongated portion 11; and the corner portions 12 referred to as the side edge portions, said corner portions 12 being provided on the end portions of the elongated portion 11 in the longitudinal direction thereof, specifically in a direction intersecting said longitudinal direction, while such corner portions 12 are each provided with the male clip 2A extending in the substantially longitudinal direction of said elongated portion 11. Accordingly, the position of each male clip 2A provided on each corner portion 12 may be adjusted relative to a direction intersecting the longitudinal direction, thereby allowing the end portion of the elongated portion 12 to be fitted to the front bumper 3 without leaving any undesired space.

According to the present embodiment and with respect to the fourth aspect, since the transverse dimension of the insertion hole 4 is made 1.5 or more times longer than that of the male clips 2, 2A, the marginal difference between the front bumper 3 and the front spoiler 1 can be absorbed unfailingly.

According to the present embodiment and with respect to the fifth aspect, the component is the bumper 3 made of synthetic resin, and the attachment is the front spoiler 1 also made of synthetic resin. Accordingly, at the time of the mounting of the synthetic resin spoiler 1 on the synthetic resin bumper 3, the gaps between the insertion holes 4 and the male clips 2, 2A enable the increasing of the degree of freedom of positional adjustment, namely the degree of freedom of mounting, thus reducing the number of the steps for mounting as well as the number of the procedures for controlling the accuracy of the attachment and reducing the overall cost.

Further, as shown in FIG. 6, since the male clips 2,2A are formed into a thin strip shape and bendable in the vicinity of the insertion holes 4, the male clips 2, 2A can serve its primary purpose even if the surface of the front spoiler 1 to which the male clip 2 is attached is not parallel with the surface of the front bumper 3 on which the insertion hole 4 is provided. Further, as shown in FIG. 6, each insertion hole 4 is positioned higher than the portion to which each of the male clips 2,2A is attached, thus allowing the front spoiler 1 to be stably mounted on the front bumper 3 in such a manner that the front spoiler 1 is lifted upwards. In addition, each male clip 2A is provided on the upper portion of each corner portion 12, protruding in a substantially lateral direction so that the spoiler 1 is allowed to slide only within the gap between the insertion hole 4 and the male clip 2A, thus eliminating the necessity of employing an extra member to mechanically secure the upper portion of the corner portion 12 to the wheel housing portion 103 of the front bumper 3.

Second Embodiment

Figure 7:
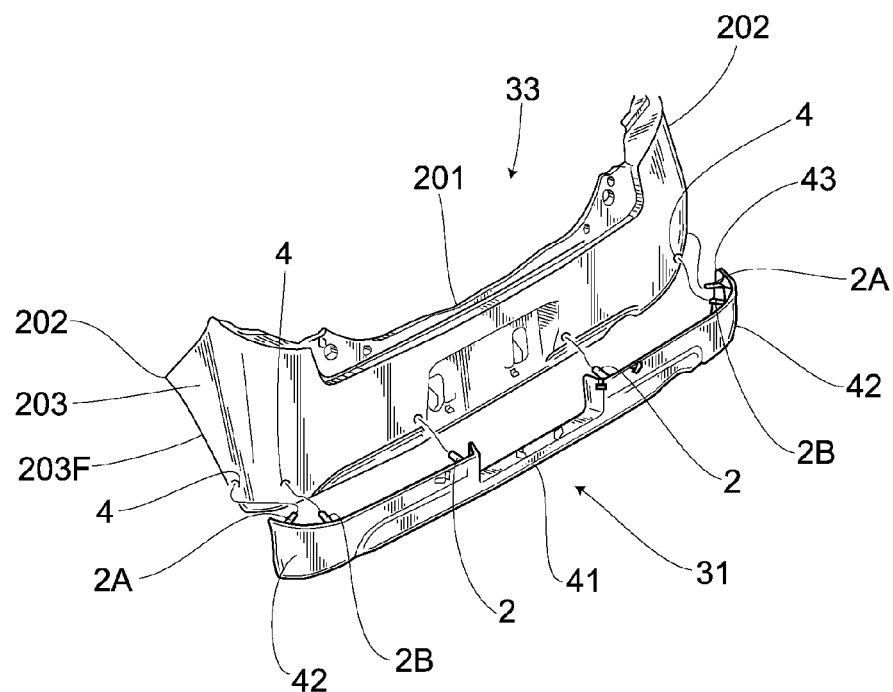
FIG. 7 is a perspective view showing the rear side of a vehicle, illustrating a method for mounting the attachment on the rear side thereof, according to a second embodiment of the present invention.
Figure 8:
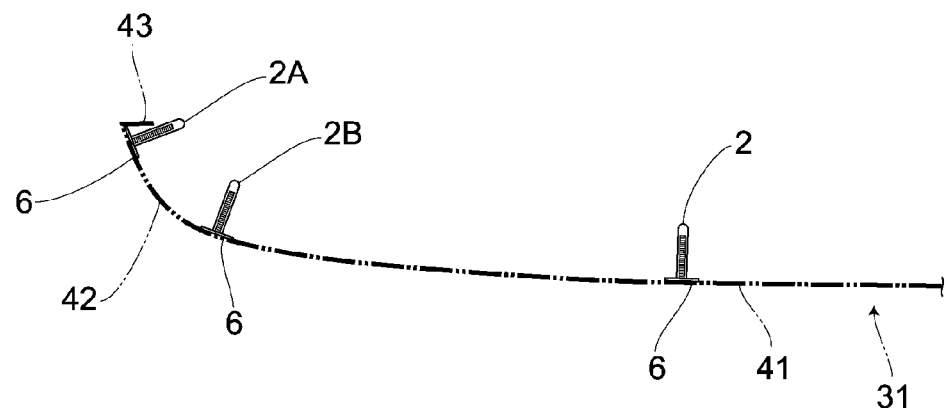
FIG. 8 is a top plan view of the attachment according to the second embodiment as above.

FIGS. 7 and 8 are diagrams illustrating a second embodiment of the present invention, in which same symbols are used to illustrate portions identical to those in the first embodiment. Schematically, the second embodiment includes: strip-shaped male clips 2, 2A, 2B provided on a rear spoiler 31 made of synthetic resin and referred to as the attachment; insertion holes 4 provided on a rear bumper 33 also made of synthetic resin and referred to as the component, the insertion holes 4 being provided for inserting the male clips 2, 2A, 2B therethrough; and female clips 5 to be engaged with the male clips 2, 2A, 2B.

Said rear bumper 33 is integrally provided with an elongated portion 201 extending toward the left and right thereof, and corner portions 202 provided on the end portion of the elongated portion 201 and referred to as the side edge portion, with the corner portion 202 being formed in a substantially back-to-front direction intersecting the longitudinal direction of the elongated portion 201. Further, a wheel housing portion 203 constituting a part of a wheel house of a vehicle is formed on the end portion of said corner portion 202.

Said rear spoiler 31 is an under spoiler disposed along the lower portion of the outer surface of said rear bumper 33, and integrally provided with: an elongated portion 41 extending toward the left and right thereof; and corner portions 42 provided on the end portions of the elongated portion 41 and referred to as the side edge portion. Each corner portion 42 is formed in a substantially front-to-back direction intersecting the longitudinal direction of the elongated portion 41. Further, each corner portion 42 is provided at its end with a wheel house flange portion 43 protruding inwardly, covering a periphery 203F of the wheel housing portion 203.

A plurality of said male clips 2, 2A, 2B having a strip-like shape are provided on the rear surface of the rear spoiler 31. More specifically, two male clips 2 are provided on both the left and right sides with respect to the center of the elongated portion 41, protruding from the inner side thereof toward a substantially rear direction. Further, the male clip 2A is provided on both the left and right corner portions 42, each protruding from the rear surface thereof in a substantially lateral direction. In addition, the male clip 2B is provided on a proximal end of each corner portion 42, each protruding in a substantially rear direction. Such male clips 2, 2A, 2B are all provided on the upper portion of the rear spoiler 31.

A structure for mounting the rear spoiler 31 on the rear bumper 33, according to the second embodiment, includes: the male clips 2, 2A, 2B provided on the rear spoiler 31; the insertion holes 4 provided on the rear bumper 33, for inserting the male clips 2, 2A, 2B therethrough; and the female clips 5 which are to be engaged with the male clips 2, 2A, 2B inserted through the insertion holes 4 so as to allow the spoiler 31 to be held by the bumper 33. More specifically, the male clips 2, 2A, 2B are loosely inserted through the insertion holes 4 and engaged with the female clips 5 around the insertion holes 4.

Further, the insertion holes 4 for inserting the male clips 2A, 2B therethrough are provided substantially on the end portion of the rear bumper 33, and the male clips 2A are provided on the corner portions 42, extending in the substantially longitudinal direction of the elongated portion 41. In this sense, the structure for mounting an attachment for vehicle described in the second embodiment achieves the same benefits as those described in the first embodiment.

However, the present invention is not limited to the aforementioned embodiments. As a matter of fact, various kinds of modification can be made to the present invention without departing from the scope of the invention. For example, the present invention may be applied to various attachments other than a spoiler.

What is claimed is:

1. A mounting structure, comprising:
   a male clip provided on an attachment to be mounted on a vehicle, the male clip including a base portion and a receiving portion;
   a component mounted to the vehicle, the component including an insertion hole provided therein, for inserting said male clip therethrough; and
   a female clip engageable with said receiving portion of said male clip when said receiving portion is inserted through said insertion hole,
   wherein said receiving portion of said male clip is loosely insertable through said insertion hole, while said female clip is engaged with said receiving portion of said male clip around said insertion hole, such that said component is sandwiched between said female clip and said base portion of said male clip, thereby allowing said attachment to be mounted on a component already mounted on a vehicle.

2. The mounting structure according to claim 1, wherein said attachment is an elongated member and said insertion hole is provided substantially on an end portion of said component.

3. The mounting structure according to claim 2, wherein said attachment comprises:
   an elongated portion; and
   a side edge portion provided on an end portion of the elongated portion in a longitudinal direction thereof, said side edge portion being formed in a direction intersecting said longitudinal direction,
   wherein said male clip is provided on said edge portion, extending in a substantially longitudinal direction of the elongated portion.

4. The mounting structure according to claim 1, wherein a diameter of said insertion hole is 1.5 or more times a width of said receiving portion of said male clip.

5. The mounting structure according to claim 2, wherein a diameter of said insertion hole is 1.5 or more times a width of said receiving portion of said male clip.

6. The mounting structure according to claim 3, wherein a diameter of said insertion hole is 1.5 or more times a width of said receiving portion of said male clip.

7. The mounting structure according to claim 1, wherein said component is a bumper made of synthetic resin, and
   wherein said attachment is a spoiler made of synthetic resin.

8. The mounting structure according to claim 2, wherein said component is a bumper made of synthetic resin, and
   wherein said attachment is a spoiler made of synthetic resin.

9. The mounting structure according to claim 3, wherein said component is a bumper made of synthetic resin, and
   wherein said attachment is a spoiler made of synthetic resin.

10. The mounting structure according to claim 4, wherein said component is a bumper made of synthetic resin, and
    wherein said attachment is a spoiler made of synthetic resin.

11. The mounting structure according to claim 1, wherein said insertion hole is positioned higher than a portion to which said male clip is attached.

* * * * *